US009198398B2

(12) United States Patent
Rogers

(10) Patent No.: US 9,198,398 B2
(45) Date of Patent: Dec. 1, 2015

(54) ANIMAL DRINKING ASSEMBLY

(71) Applicant: Titinia L. Rogers, Ventura, CA (US)

(72) Inventor: Titinia L. Rogers, Ventura, CA (US)

( * ) Notice: Subject to any disclaimer, the term of this patent is extended or adjusted under 35 U.S.C. 154(b) by 70 days.

(21) Appl. No.: 14/243,113

(22) Filed: Apr. 2, 2014

(65) Prior Publication Data
US 2015/0282453 A1    Oct. 8, 2015

(51) Int. Cl.
*A01K 7/06*    (2006.01)
*A01K 39/02*    (2006.01)

(52) U.S. Cl.
CPC .. *A01K 7/06* (2013.01); *A01K 39/02* (2013.01)

(58) Field of Classification Search
CPC ..... A01K 39/02; A01K 39/0206; A01K 7/02; A01K 7/06
USPC .......................................................... 119/75
See application file for complete search history.

(56) References Cited

U.S. PATENT DOCUMENTS

| 3,272,181 | A | * | 9/1966 | Ramsey | 119/76 |
| 5,495,826 | A | * | 3/1996 | Lindbloom et al. | 119/75 |
| 5,799,609 | A | | 9/1998 | Burns et al. | |
| 5,845,600 | A | | 12/1998 | Mendes | |
| D432,279 | S | | 10/2000 | Kim | |
| 6,526,916 | B1 | * | 3/2003 | Perlsweig | 119/74 |
| 6,622,657 | B2 | | 9/2003 | Northrop et al. | |
| 6,928,954 | B2 | | 8/2005 | Krishnamurthy | |
| 7,677,200 | B2 | * | 3/2010 | Lytle | 119/76 |
| 7,757,636 | B2 | | 7/2010 | McCallum et al. | |
| 8,117,991 | B1 | * | 2/2012 | Civitillo | 119/73 |
| 2008/0190374 | A1 | * | 8/2008 | Farris | 119/74 |
| 2008/0257272 | A1 | | 10/2008 | Bolda | |
| 2011/0260077 | A1 | * | 10/2011 | Boschert | 250/432 R |

FOREIGN PATENT DOCUMENTS

GB    2458173    10/2012
WO    WO2011163281    12/2011

* cited by examiner

*Primary Examiner* — Kristen C Hayes

(57) ABSTRACT

A animal drinking assembly includes a base that is positionable in an animal's environment. An interior of the base is exposed to the animal's environment. A container is coupled to the base. The container contains a fluid. A spout is operationally coupled to the container. The spout dispenses the fluid when the animal engages the spout. The spout is positioned proximate the interior of the base so the base captures spilled fluid. A filter is coupled to the base so the filter absorbs the spilled fluid in the base. A fluid tube is operationally coupled between the container and the filter. A pump is operationally coupled to the fluid tube. The pump urges the spilled fluid through the filter and into the container so the spilled fluid is filtered and returned to the container.

16 Claims, 5 Drawing Sheets

ANIMAL DRINKING ASSEMBLY

BACKGROUND OF THE DISCLOSURE

Field of the Disclosure

The disclosure relates to animal drinking devices and more particularly pertains to a new animal drinking device for storing and dispensing a fluid such that the fluid is prevented from entering the animal's environment.

SUMMARY OF THE DISCLOSURE

An embodiment of the disclosure meets the needs presented above by generally comprising a base that is positionable in an animal's environment. An interior of the base is exposed to the animal's environment. A container is coupled to the base. The container contains a fluid. A spout is operationally coupled to the container. The spout dispenses the fluid when the animal engages the spout. The spout is positioned proximate the interior of the base so the base captures spilled fluid. A filter is coupled to the base so the filter absorbs the spilled fluid in the base. A fluid tube is operationally coupled between the container and the filter. A pump is operationally coupled to the fluid tube. The pump urges the spilled fluid through the filter and into the container so the spilled fluid is filtered and returned to the container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
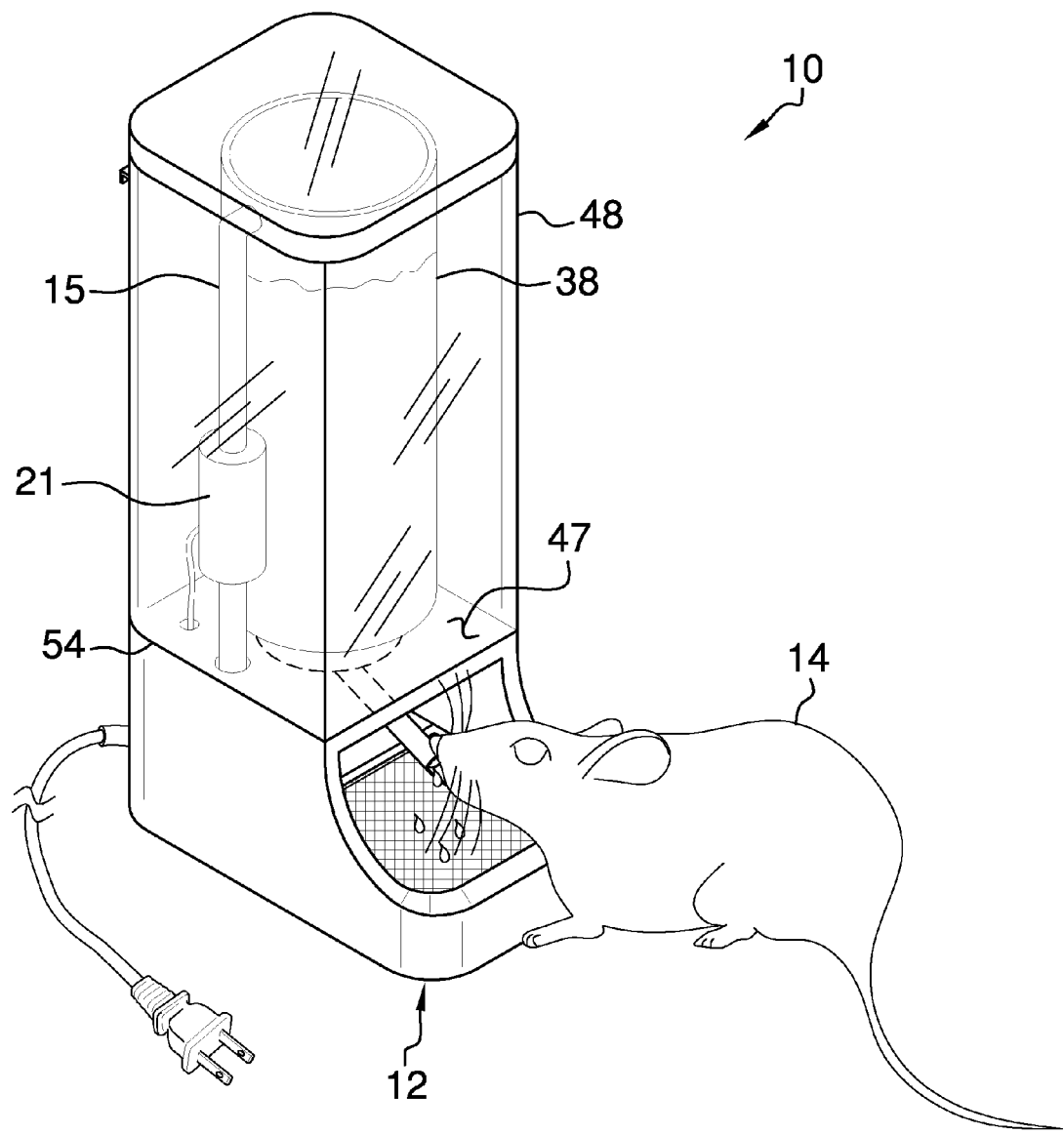
FIG. 1 is a perspective view of a animal drinking assembly according to an embodiment of the disclosure.
Figure 2:
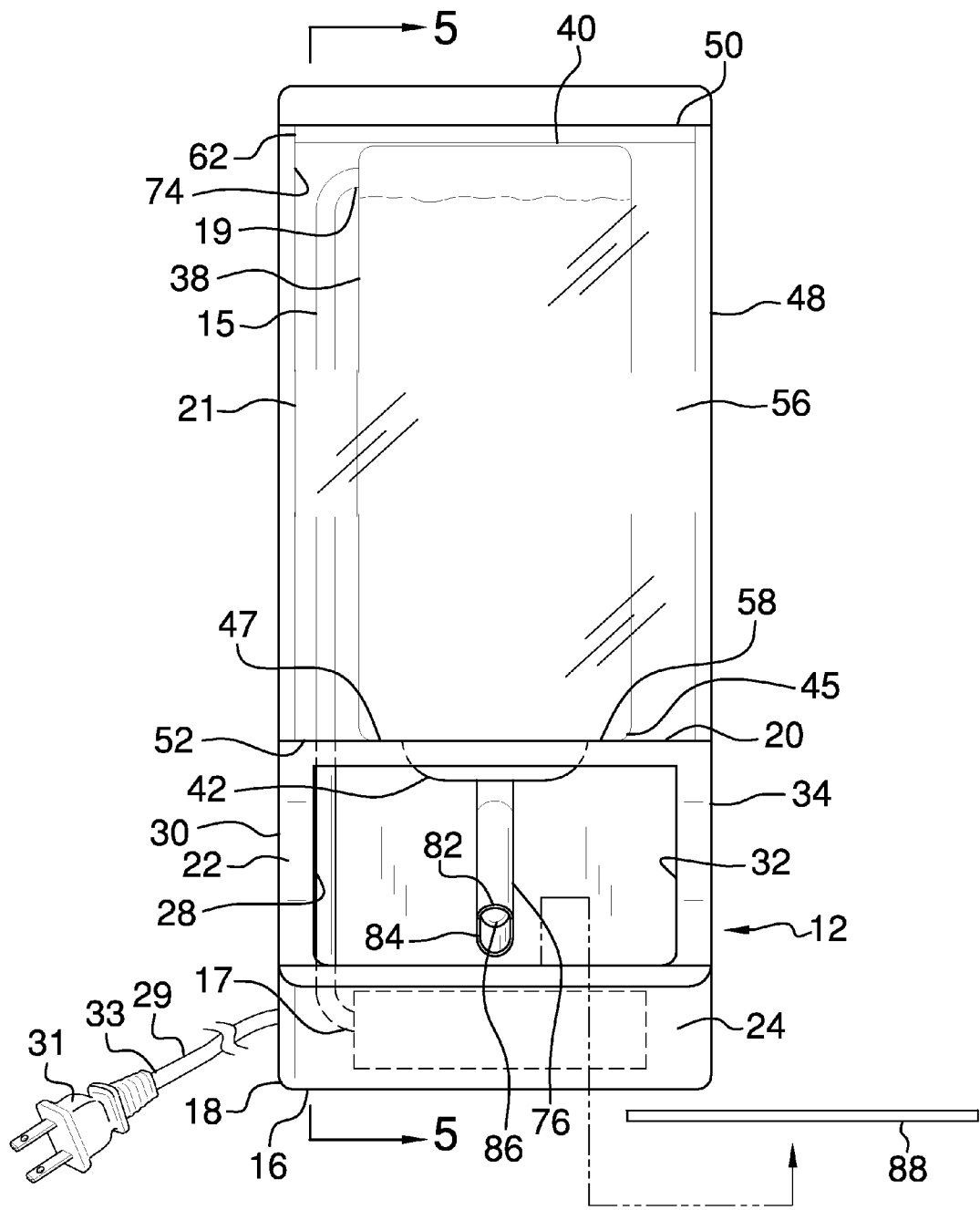
FIG. 2 is a front view of an embodiment of the disclosure.
Figure 3:
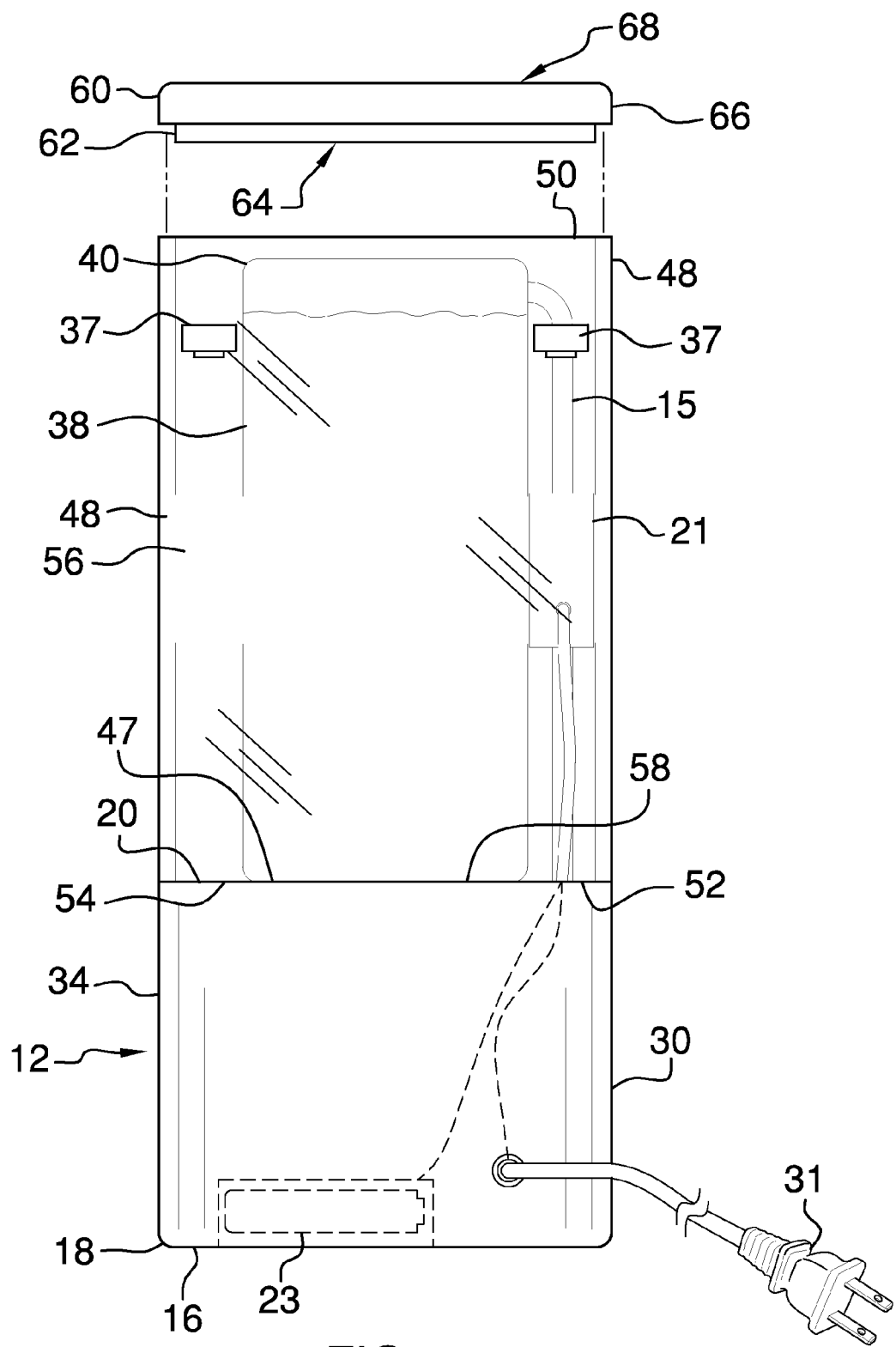
FIG. 3 is a back view of an embodiment of the disclosure.
Figure 4:
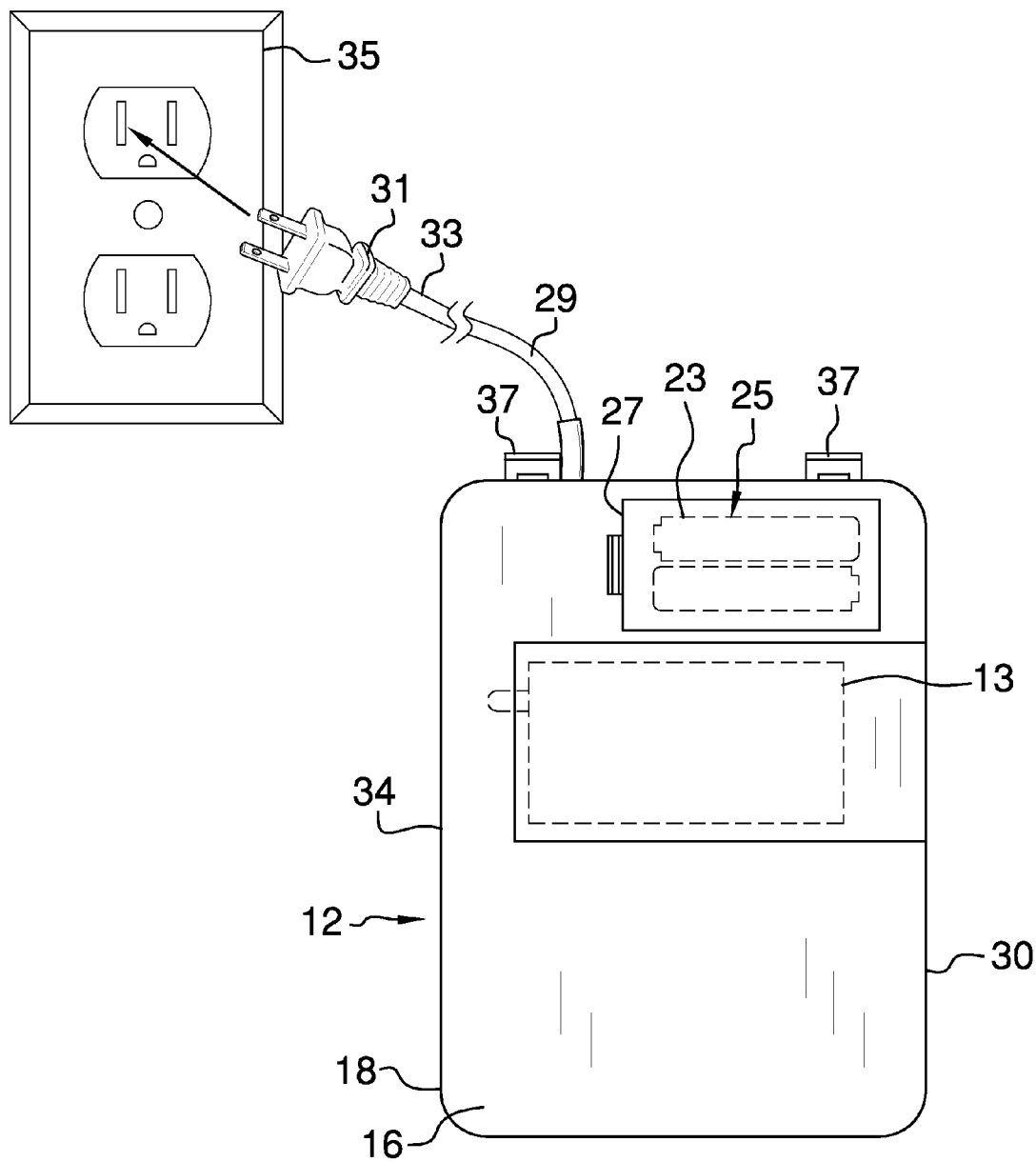
FIG. 4 is a bottom view of an embodiment of the disclosure.
Figure 5:
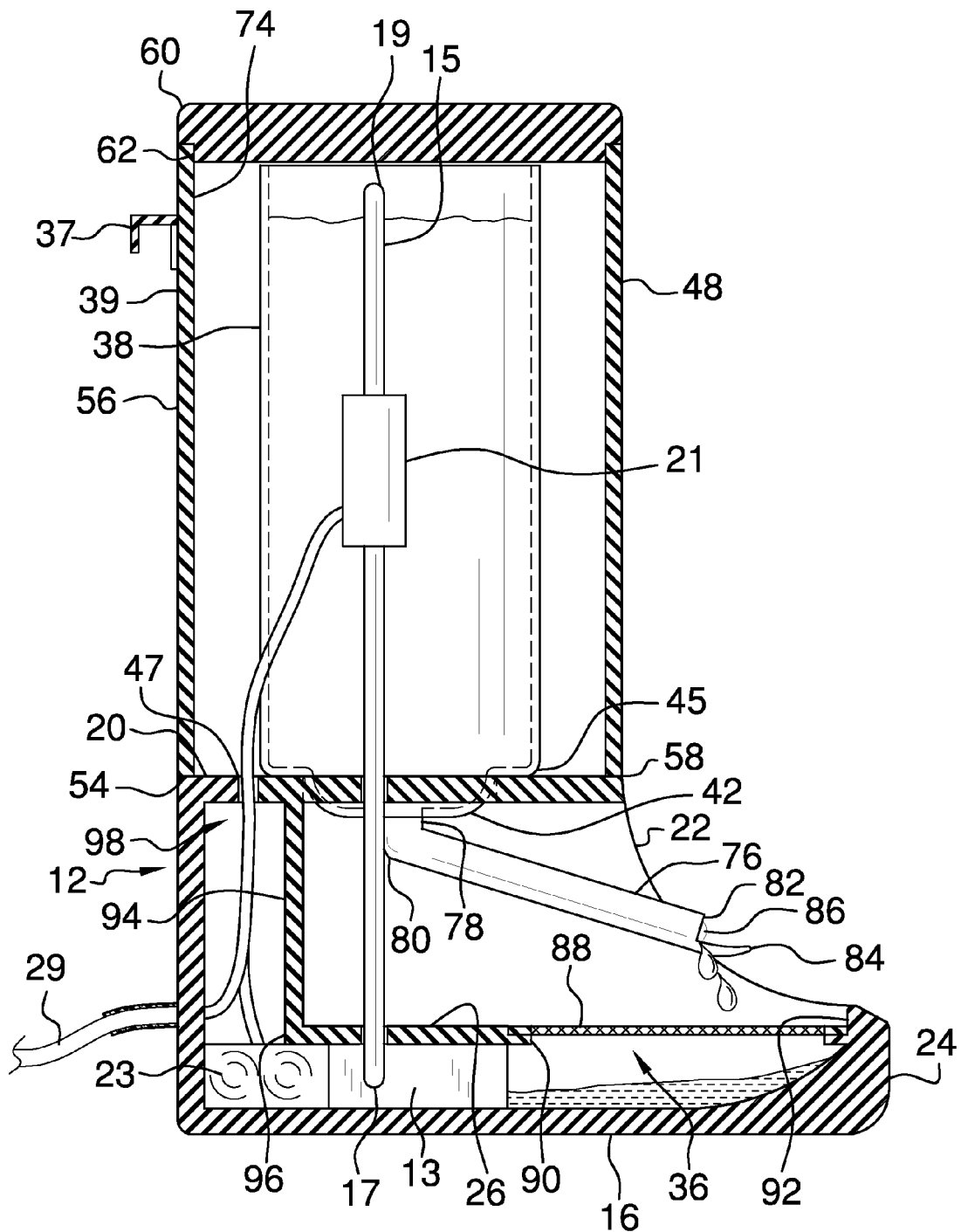
FIG. 5 is a cross sectional view taken along line 5-5 if FIG. 2 of an embodiment of the disclosure.

With reference now to the drawings, and in particular to FIGS. 1 through 5 thereof, a new animal drinking device embodying the principles and concepts of an embodiment of the disclosure and generally designated by the reference numeral 10 will be described.

As best illustrated in FIGS. 1 through 5, the animal drinking assembly 10 generally comprises a base 12 that is positionable in an animal's environment. The animal's environment may comprise a cage of any conventional design. Moreover, the animal 14 may be a rodent of any species. The animal 14 may be maintained as a pet.

A bottom side 16 of an outer wall 18 of the base 12 has a length is greater than a length of a top side 20 of the outer wall 18 of the base 12. A front side 22 of the outer wall 18 of the base 12 is concavely arcuate between a forward side 24 and the top side 20 of the outer wall 18 of the base 12. The front side 22 of the outer wall 18 of the base 12 is open to an interior of the base 12. The base 12 has a medial wall 26 extending between an inner surface 28 of a first lateral side 30 and an inside surface 32 of a second lateral side 34 of the outer wall 18 of the base 12. The medial wall 26 of the base 12 defines a filter space 36 between the medial wall 26 and the bottom side 16 of the outer wall 18 of the base 12.

A container 38 has a top end 40 and a bottom end 42. The top end 40 of the container 38 is open. The container 38 is elongated between the top 40 and bottom 42 ends. An outside wall 44 of the of the container 38 is curvilinear so the container 38 has a cylindrical shape. The container 38 contains a fluid 46. The fluid 46 may be water.

The bottom end 42 of the container 38 has a diameter that is less than a diameter of the top end 40 of the container 38. The bottom end 42 of the container 38 extends through the top side 20 of the outer wall 18 of the base 12. A shoulder 45 of the container 38 abuts a top surface 47 of the top side 20 of the outer wall 18 of the base 12 so the container 38 is retained on the base 12. The container 38 is centrally positioned on the top side 20 of the outer wall 18 of the base 12.

A housing 48 has a lower end 50 and an upper end 52. Each of the lower 50 and upper 52 ends of the housing 48 is open. The housing 48 is elongated between the upper 52 and lower 50 ends. A bottom edge 54 of an exterior wall 56 of the housing 48 abuts the top side 20 of the outer wall 18 of the base 12. Moreover, the bottom edge 54 of the exterior wall 56 of the housing 48 is coextensive with an outer edge 58 of the top side 20 of the outer wall 18 of the base 12 so the housing 48 completely surrounds the container 38. The housing 48 may be comprised of a rigid and translucent material.

A lid 60 is removably coupled to the upper end 52 of the housing 48. An outer edge 62 of a lower portion 64 of the lid 60 is spaced inwardly from a outermost edge 66 of a top portion 68 of the lid 60. The lower portion 64 of the lid 60 extends into the upper end 52 of the housing 48 so a bottom 70 of the top portion 68 of the lid 60 abuts an uppermost edge 72 of the housing 48. The outer edge 62 of the lower portion 68 of the lid 60 abuts an innermost surface 74 of the housing 48.

A spout 76 is provided. A coupled end 78 of the spout 76 is fluidly coupled to the bottom end 42 of the container 38. The spout 76 has a bend 80 thereon so a free end 82 of the spout 76 is directed away from the coupled end 78 of the spout 76 at an obtuse angle. A lip 84 extends forwardly away from the free end 82 of the spout 76. Additionally, a ball 86 is movably positioned within the free end 82 of the spout 76. The ball 86 closes the free end 82 of the spout 76 so the fluid 46 does not drain from the spout 76.

The free end 82 of the spout 76 is positioned within the interior of the base 12 proximate the front side 22 of the outer wall 18 of the base 12. The free end 82 of the spout 76 is accessible to the animal 14. The spout 76 dispenses the fluid 46 when the animal 14 engages the ball 86 in the free end 82 of the spout 76. The free end 82 of the spout 76 is spaced upwardly from the bottom side 16 of the outer wall 18 of the base 12. Spilled fluid 46 from the spout 76 is captured in the filter space 36. The base 12 prevents the fluid 46 from entering the animal's environment so the animal's environment remains dry.

A screen 88 is removably coupled to the base 12. The screen 88 extends between a front edge 90 of the medial wall 26 of the base 12 and an interior surface 92 of the forward side 24 of the outer wall 18 of the base 12. Additionally, the screen 88 extends between the inner surface 28 of the first lateral side 30 and the inside surface 32 of the second lateral side 34 of the outer wall 18 of the housing 12. The screen 88 prevents the animal 14 from contacting the spilled fluid 46 in the base 12.

A vertical wall 94 of the base 12 is provided. The vertical wall 94 of the base 12 extends between a back edge 96 of the medial wall 26 of the base 12 and the top side 20 of the outer wall 18 of the base 12. The vertical wall 94 of the base 12 additionally extends between the inner surface 28 of the first lateral side 30 and the inside surface 32 of the second lateral side 34 of the outer wall 18 of the base 12. The vertical wall 94 of the base 12 defines a cord space 98 between the vertical wall 94 of the base 12 and a back side 11 of the outer wall 18 of the base 12.

A filter 13 is positioned within the filter space 36. The filter 13 abuts the bottom side 16 of the outer wall 18 of the base 12. The filter 13 absorbs the spilled fluid 46 in the filter space 36. Finally, the filter 13 may be a water filter of any conventional design.

A fluid tube 15 extends downwardly through the top side 20 of the outer wall 18 of the base 12 and the medial wall 26 of the base 12. A lowermost end 17 of the fluid tube 15 is fluidly coupled to the filter 13. An uppermost end 19 of the fluid tube 15 is fluidly coupled to the outside wall 44 of the container 38 proximate the top end 40 of the container 38. A pump 21 is coupled to the outside wall 44 of the container 38. The pump 21 is fluidly coupled to the fluid tube 15. The pump 21 urges the spilled fluid 46 through the filter 13 and into the container 38 so the spilled fluid 46 is filtered and returned to the container 38. The pump 21 may be a fluid pump of any conventional design.

A power supply 23 is coupled to the bottom side 16 of the outer wall 18 of the base 12. The power supply 23 is positioned within the filter space 36 behind the filter 13. The power supply 23 is electrically coupled to the pump 21. The power supply 23 comprises at least one battery 25.

A battery cover 27 is removably coupled to the bottom side 16 of the outer wall 18 of the base 12. The battery 25 is positioned above the battery cover 27. A power cord 29 is electrically coupled to the pump 21. The power cord 29 extends through the cord space 98 and rearwardly away from the back side 11 of the outer wall 18 of the base 12. A plug 31 is electrically coupled to a loose end 33 of the power cord 29. The plug 31 may be electrically coupled to a power source 35. The power source 35 may be an electrical outlet of any conventional design.

A pair of tabs 37 is each coupled to a rear side 39 of the exterior wall 56 of the housing 48. Each of the pair of tabs 37 is spaced apart and positioned proximate the upper end 52 of the housing 48. The pair of tabs 37 selectively engages the cage. Finally, the pair of tabs 37 retains the assembly 10 on the cage.

In use, the lid 60 is removed from the housing 48 and the container 38 is filled with fluid 46. The power cord 29 is electrically coupled to the power source 35 if the battery 25 is not utilized. The animal 14 pushes the ball 86 rearwardly into the spout 76 and drinks the fluid 46 from the spout 76. The pump 21 continuously circulates the spilled fluid 46 through the filter 13. Additionally, the base 12 retains the spilled fluid 46 to prevent mold growth or other moisture related growth in the animal's environment. The container 38 is refilled with fluid 46 when the animal 14 drinks all of the fluid 46 in the container 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal drinking assembly for storing and dispensing a fluid such that the fluid is prevented from entering the animal's environment, said assembly comprising:
   a base positionable in the animal's environment, an interior of said base being exposed to the animal's environment;
   a container coupled to said base, said container containing the fluid;
   a spout operationally coupled to said container, said spout dispensing the fluid when the animal engages said spout, said spout being positioned proximate said interior of said base such that said base captures spilled fluid;
   a filter coupled to said base such that said filter absorbs the spilled fluid in said base;
   a fluid tube operationally coupled between said container and said filter; and
   a pump operationally coupled to said fluid tube, said pump urging the spilled fluid through said filter and into said container such that the spilled fluid is filtered and returned to said container.

2. The assembly according to claim 1, wherein a bottom side of an outer wall of said base having a length being greater than a length of a top side of said outer wall of said housing such that a front side of said outer wall of said housing is concavely arcuate between said bottom and top sides of said outer wall of said base, said front side of said outer wall of said base being open to said interior of said base.

3. The assembly according to claim 1, wherein said base having a medial wall extending between an inner surface of a first lateral side and an inside surface of a second lateral side of an outer wall of said base, said medial wall of said base defining a filter space between said medial wall and a bottom side of said outer wall of said base.

4. The assembly according to claim 1, wherein said container having a top end and a bottom end, said top end being open, said container being elongated between said top and bottom ends, an outside wall of said of said container being curvilinear such that said container has a cylindrical shape.

5. The assembly according to claim 1, wherein a bottom end of said container having a diameter being less than a diameter of a top end of said container, said bottom end of said container extending through a top side of an outer wall of said base, a shoulder of said container abutting a top surface of said top side of said outer wall of said base such that said container is retained on said base.

6. The assembly according to claim 1, wherein a housing having a lower end and an upper end, each of said lower and upper ends of said housing being open, said housing being elongated between said upper and lower ends.

7. The assembly according to claim 1, wherein a bottom edge of an exterior wall of a housing abutting a top side of an outer wall of said base such that said bottom edge of said exterior wall of said housing is coextensive with an outer edge of said top side of said outer wall of said base, said housing completely surrounding said container.

8. The assembly according to claim 1, wherein said spout having a coupled end being fluidly coupled to a bottom end of said container, said spout having a bend thereon such that a free end of said spout is directed away from said coupled end of said spout at an obtuse angle.

9. The assembly according to claim 1, wherein a free end of said spout being positioned within said interior of said base proximate a front side of an outer wall of said base such that said free end of said spout is accessible to the animal, said free end of said spout being spaced upwardly from a bottom side of said outer wall of said base such that the spilled fluid from said spout is captured in a filter space.

10. The assembly according to claim 1, wherein said filter being positioned within a filter space such that said filter abuts a bottom side of an outer wall of said base.

11. The assembly according to claim 1, wherein said fluid tube extending downwardly through a top side of an outer wall of said base and a medial wall of said base such that a lowermost end of said fluid tube is fluidly coupled to said filter, an uppermost end of said fluid tube being fluidly coupled to an outside wall of said container proximate a top end of said container.

12. The assembly according to claim 1, wherein said pump being coupled to an outside wall of said container, said pump being fluidly coupled to said fluid tube.

13. The assembly according to claim 1, wherein a power supply coupled to a bottom side of an outer wall of said base such that said power supply is positioned within a filter space.

14. The assembly according to claim 13, wherein said power supply being electrically coupled to said pump.

15. The assembly according to claim 14, wherein said power supply comprising at least one battery.

16. An animal drinking assembly for storing and dispensing a fluid such that the fluid is prevented from entering the animal's environment, said assembly comprising:

a base positionable in the animal's environment, a bottom side of an outer wall of said base having a length being greater than a length of a top side of said outer wall of said housing such that a front side of said outer wall of said housing is concavely arcuate between said bottom and top sides of said outer wall of said base, said front side of said outer wall of said base being open to an interior of said base, said base having a medial wall extending between an inner surface of a first lateral side and an inside surface of a second lateral side of said outer wall of said base, said medial wall of said base defining a filter space between said medial wall and said bottom side of said outer wall of said base;

a container having a top end and a bottom end, said top end being open, said container being elongated between said top and bottom ends, an outside wall of said of said container being curvilinear such that said container has a cylindrical shape, said container containing the fluid, said bottom end of said container having a diameter being less than a diameter of said top end of said container, said bottom end of said container extending through said top side of said outer wall of said base, a shoulder of said container abutting a top surface of said top side of said outer wall of said base such that said container is retained on said base;

a housing having a lower end and an upper end, each of said lower and upper ends of said housing being open, said housing being elongated between said upper and lower ends, a bottom edge of an exterior wall of said housing abutting said top side of said outer wall of said base such that said bottom edge of said exterior wall of said housing is coextensive with an outer edge of said top side of said outer wall of said base, said housing completely surrounding said container;

a spout having a coupled end fluidly coupled to said bottom end of said container, said spout having a bend thereon such that a free end of said spout is directed away from said coupled end of said spout at an obtuse angle, said free end of said spout being positioned within said interior of said base proximate said front side of said outer wall of said base such that said free end of said spout is accessible to the animal, said spout dispensing the fluid when the animal engages said free end of said spout, said free end of said spout being spaced upwardly from said bottom side of said outer wall of said base such that spilled fluid from said spout is captured in said filter space;

a filter positioned within said filter space such that said filter abuts said bottom side of said outer wall of said base, said filter absorbing the spilled fluid in said filter space;

a fluid tube extending downwardly through said top side of said outer wall of said base and said medial wall of said base such that a lowermost end of said fluid tube is fluidly coupled to said filter, an uppermost end of said fluid tube being fluidly coupled to said outside wall of said container proximate said top end of said container;

a pump coupled to said outside wall of said container, said pump being fluidly coupled to said fluid tube, said pump urging the spilled fluid through said filter and into said container such that the spilled fluid is filtered and returned to said container; and a power supply coupled to said bottom side of said outer wall of said base such that said power supply is positioned within said filter space, said power supply being electrically coupled to said pump, said power supply comprising at least one battery.

\* \* \* \* \*